United States Patent
Song et al.

(10) Patent No.: US 9,568,319 B2
(45) Date of Patent: Feb. 14, 2017

(54) ANGULAR VELOCITY DETECTION METHOD ADOPTING BI-DIRECTIONAL FULL RECIPROCAL COUPLING OPTOELECTRONIC OSCILLATOR

(71) Applicant: ZHEJIANG UNIVERSITY, Hangzhou (CN)

(72) Inventors: Kaichen Song, Hangzhou (CN); Jinlong Yu, Hangzhou (CN); Lingyun Ye, Hangzhou (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 14/981,808

(22) Filed: Dec. 28, 2015

(65) Prior Publication Data
US 2016/0116288 A1 Apr. 28, 2016

Related U.S. Application Data

(63) Continuation of application No. PCT/CN2014/075436, filed on Apr. 16, 2014.

(30) Foreign Application Priority Data

Sep. 29, 2013 (CN) .......................... 2013 1 0449584

(51) Int. Cl.
*G01C 19/72* (2006.01)
(52) U.S. Cl.
CPC ............. *G01C 19/727* (2013.01); *G01C 19/72* (2013.01)
(58) Field of Classification Search
CPC ............................... G01C 19/727; G01C 19/72
See application file for complete search history.

(56) References Cited

U.S. PATENT DOCUMENTS

| | | | |
|---|---|---|---|
| 5,969,816 A * | 10/1999 | Kim .................... | G01C 19/64 356/460 |
| 2007/0086015 A1 | 4/2007 | Sanders et al. ............... | 356/461 |

FOREIGN PATENT DOCUMENTS

| CN | 101126642 A | 2/2008 |
|---|---|---|
| CN | 101149264 A | 3/2008 |

(Continued)

OTHER PUBLICATIONS

Wang Wenyi. "Double Closed-Loop Resonator Micro Optic Gyro" Chinese journal of Lasers, vol. 39, No. 12, (Dec. 2012).

(Continued)

*Primary Examiner* — Hwa Lee
(74) *Attorney, Agent, or Firm* — J.C. Patents

(57) ABSTRACT

The present invention provides an angular velocity detection method adopting a bi-directional full reciprocal coupling optoelectronic oscillator, which is implemented on an optical carrier microwave gyroscope. The optical carrier microwave gyroscope is a bi-directional resonant optical carrier microwave angular velocity measurement device sharing one optical fiber loop. The core of the method lies in that the Sagnac effect is sensed using a bi-directional optical carrier microwave resonant cavity, where the optical carrier microwave resonant cavity employs a coupling optoelectronic oscillator to achieve a bi-directional full reciprocal optical fiber path, and non-reciprocity error of the resonant cavity is eliminated effectively. The angular velocity detection method has features of high-precision, easy implementation and low costs.

1 Claim, 2 Drawing Sheets

(56) References Cited

FOREIGN PATENT DOCUMENTS

| | | | |
|---|---|---|---|
| CN | 101451841 | A | 6/2009 |
| CN | 103267522 | A | 8/2013 |
| CN | 103278150 | A | 9/2013 |
| CN | 103471579 | A | 12/2013 |
| JP | 61-246615 | A | 11/1986 |

OTHER PUBLICATIONS

Wang, Wenyi. "Design and Implementation of Digital Signal Processor for Resonant Micro Optic Gyro" Zhejiang University Science-Engineering Master's Theses, (Jan. 2013).
Chen, Yan. "Double Closed-loop Resonator Integrated Optic Gyroscope" Zhejiang University Science-Engineering Master's Theses, (Jun. 2012).
Sun, Zhong. "Signal Detection Technique for Double Closed-loop Resonator Micro optic Gyro" Zhejiang University Science-Engineering Master's Theses, (Feb. 2012).
International Search Report of corresponding International PCT Application No. PCT/CN2014/075436, dated Jul. 16, 2014.
Chinese First Examination Report of corresponding China Application No. 201310449584.6, dated Jun. 24, 2015.

\* cited by examiner

US 9,568,319 B2

ANGULAR VELOCITY DETECTION METHOD ADOPTING BI-DIRECTIONAL FULL RECIPROCAL COUPLING OPTOELECTRONIC OSCILLATOR

CROSS-REFERENCE TO RELATED APPLICATIONS

This application is a continuation of International Application No. PCT/CN2014/075436, filed on Apr. 16, 2014, which claims priority to Chinese Patent Application No. 201310449584.6, filed on Sep. 29, 2013, both of which are hereby incorporated by reference in their entireties.

TECHNICAL FIELD

The present invention belongs to the technical field of high-precision gyroscope, which relates to an angular velocity detection technique and, in particular, to an angular velocity detecting method adopting a bi-directional full reciprocal coupling optoelectronic oscillator.

BACKGROUND

The inertial technology is one of core technologies for a national defense weapon equipment system, which plays a very important role in improving rapid mobility of troops, conducting precision strikes and improving self-viability. In the field of inertial navigation, a gyroscope is used to measure an inertial angular velocity generally. A high-precision gyroscope directly affects navigation precision of an inertial navigation system, thus, a precision level of the gyroscope is a measure of national military technology levels.

Currently, practical high-precision gyroscopes mainly include electrostatic gyroscope and threefold floated gyroscope. The electrostatic gyroscope is the most accurate gyroscope so far, but it has a large size, its key component requires very high dimension accuracy, thus the processing is difficult, and costs are also very high. The threefold floated gyroscope is a mechanical gyroscope with stability of drift second only to the electrostatic gyroscope, however, high processing precision, strict assembly and precise temperature control are also required, and thus its costs are also very high.

High-precision gyroscopes which are being explored in theory include cold atom gyroscope, nuclear magnetic resonance gyroscope and slow light gyroscope. The cold atom gyroscope is implemented based on a cold atom interferometer, which has great potential sensitivity, but is difficult to be implemented. Precision of the nuclear magnetic resonance gyroscope with a cryogenic superconductor may surpass that of the electrostatic gyroscope theoretically, however, the sophistication of currently developed prototypes is far less than the level of the electrostatic gyroscope, which also brings high processing difficulty and production costs. As for the slow light gyroscope, there hasn't been a successful theory verification example yet.

An optical gyroscope has features such as compact structure and high sensitivity, which commands the greatest market share of the high-precision gyroscope, it operates on the theory of detecting an angular velocity based on the Sagnac effect. However, it is difficult to improve precision of a laser gyroscope and an optical fiber gyroscope due to their own limitations such as reciprocity error and drift error of the system, which thus relegate it to the field of medium-precision and low-precision gyroscopes and it is difficult to meet the requirements of high-precision inertial navigation.

SUMMARY

An objective of the present invention aims to provide an angular velocity detecting method adopting a bi-directional full reciprocal coupling optoelectronic oscillator with regard to deficiencies of current angular velocity detecting method for a gyroscope.

The angular velocity detecting method adopting a bi-directional full reciprocal coupling optoelectronic oscillator used in the present invention is implemented on a bi-directional resonant optical carrier microwave gyroscope, the bi-directional resonant optical carrier microwave gyroscope consists of components such as a 980 nm pump laser, a first 980/1550 wavelength division multiplexer, a polarization maintaining Erbium-doped optical fiber, a second 980/1550 wavelength division multiplexer, a control light drawing-out wire, an optical filter, a 45° polariscope, a polarization splitter/combiner, a first electro-optical modulator, a second electro-optical modulator, a first optical fiber coupler, a second optical fiber coupler, a beat signal detecting and processing circuit, an optical fiber annular cavity, a 90° connector, a first photodetector, a second photodetector, a first microwave regeneration mode locking control circuit, a second microwave regeneration mode locking control circuit, a first voltage controlled oscillator, and a second voltage controlled oscillator.

The following concepts are explained prior to description of steps of the method:

A structure of the entire optical carrier microwave gyroscope is divided by the polarization splitter/combiner into a loop part and a linear cavity part, and two sections of an optical fiber of the loop part are divided by the 90° connector and are marked as L1 and L2, respectively;

An optical path of the linear cavity part of the optical carrier microwave gyroscope is specifically: light output by the laser controlled by a drive current is introduced into the polarization maintaining Erbium-doped optical fiber for amplification after passing through the first 980/1550 wavelength division multiplexer, then the light is divided into two parts via the second 980/1550 wavelength division multiplexer, where one part is control light, which is drawn off by the control light drawing-out wire, and the other part is work light, which continues to pass through frequency selective filtering of the optical filter and its polarization state is rotated by 90° via reflection of the 45° polariscope, then the light enters into the polarization splitter/combiner includes two beams of work light of which polarization states are orthogonal (marked as a horizontal polarization state and a vertical polarization state respectively), and forms a clockwise resonant loop and a counterclockwise resonant loop at the loop part.

The clockwise resonant loop of the optical carrier microwave gyroscope is specifically: the light of vertical polarization state that enters into the polarization splitter/combiner passes through the second electro-optical modulator (non-modulated) in a clockwise direction (CW), then enters into the optical fiber annular cavity via the second optical fiber coupler, and its direction of polarization is changed by 90° via the 90° connector, and the light is separated into two beams via the first optical fiber coupler after being changed from the vertical polarization light to the horizontal polarization light, where one beam re-enters into the polarization splitter/combiner to form the clockwise resonant loop after being modulated by the first electro-optical modulator; the other beam is introduced into the first photodetector, which converts an optical signal into a microwave signal, and subsequently controls the first electro-optical modulator to perform frequency lock of the clockwise resonant loop via feedback of the first microwave regeneration mode locking control circuit and the first voltage controlled oscillator.

The counterclockwise resonant loop of the optical carrier microwave gyroscope is specifically: the light of horizontal polarization state that enters into the polarization splitter/combiner passes through the first electro-optical modulator (non-modulated) and the first optical fiber coupler in a counterclockwise direction (CCW), and its direction of polarization is changed by 90° via the 90° connector, then the light enters into the optical fiber annular cavity after being changed from the horizontal polarization light to the vertical polarization light, and is separated into two beams via the second optical fiber coupler, where one beam reenters into the polarization splitter/combiner to form the counterclockwise resonant loop after being modulated by the second electro-optical modulator; the other beam is introduced into the second photodetector, which converts an optical signal into a microwave signal, and subsequently controls the second electro-optical modulator to perform frequency lock of the counterclockwise resonant loop via feedback of the second microwave regeneration mode locking control circuit and the second voltage controlled oscillator.

Total optical lengths of round trips of the clockwise light and the counterclockwise light in the linear cavity part are completely equal; in the loop part where the Sagnac effect can be sensed, polarization states of the clockwise light and the counterclockwise light in a same section of an optical fiber are totally the same, thereby ensuring good reciprocity in the entire loop.

The method includes the following steps:

Step 1: after being introduced into the polarization maintaining Erbium-doped optical fiber for amplification via the first 980/1550 wavelength division multiplexer, the horizontal polarization light emitted from the laser is then subjected to frequency selective filtering via the optical filter, and then turns into the vertical polarization light via reflection of the 45° polariscope and returns back via the optical filter, the second 980/1550 wavelength division multiplexer, the polarization maintaining Erbium-doped optical fiber and the first 980/1550 wavelength division multiplexer, which subsequently enters into the polarization splitter/combiner, and enters into the second electro-optical modulator, the second optical fiber coupler and the optical fiber annular cavity in a clockwise direction sequentially, then turns into the horizontal polarization light via the 90° connector, and then is reintroduced into the polarization maintaining Erbium-doped optical fiber for amplification after entering into the first electro-optical modulator for electro-optical modulation via the first optical fiber coupler, thereby forming the clockwise resonant loop; after being introduced into the polarization maintaining Erbium-doped optical fiber for amplification via the first 980/1550 wavelength division multiplexer, the vertical polarization light emitted from the laser is then subject to frequency selective filtering via the optical filter, and then turns into the horizontal polarization light via reflection of the 45° polariscope and returns back via the optical filter, the second 980/1550 wavelength division multiplexer, the polarization maintaining Erbium-doped optical fiber and the first 980/1550 wavelength division multiplexer, which subsequently enters into the polarization splitter/combiner, and enters into the first electro-optical modulator and the first optical fiber coupler in a counterclockwise direction sequentially, then turns into the vertical polarization light via the 90° connector, and then passes through the optical fiber annular cavity and the second optical fiber coupler sequentially, which subsequently is reintroduced into the polarization maintaining Erbium-doped optical fiber for amplification after entering into the second electro-optical modulator for electro-optical modulation, thereby forming the counterclockwise resonant loop.

Step 2: after light in the clockwise resonant loop of the optical carrier microwave gyroscope passes through the first photodetector, the optical signal is converted into a microwave signal, which is subsequently introduced into the first microwave regeneration mode locking control circuit for a frequency lock control operation, and then controls the first electro-optical modulator via feedback of the first voltage controlled oscillator, thereby locking an oscillation frequency of the clockwise resonant loop; after light in the counterclockwise resonant loop of the optical carrier microwave gyroscope passes through the second photodetector, the optical signal is converted into a microwave signal, which is subsequently introduced into the second microwave regeneration mode locking control circuit for a frequency lock control operation, and then controls the second electro-optical modulator via feedback of the second voltage controlled oscillator, thereby locking an oscillation frequency of the counterclockwise resonant loop.

Step 3: the beat signal detecting and processing circuit detects a resonant frequency difference $\Delta f$ between the clockwise resonant loop and the counterclockwise resonant loop.

Step 4: an angular velocity of rotation $\Omega_r$ can be obtained by the following formula:

$$\Omega_r = \frac{\lambda L}{4S} \Delta f;$$

where, S represents an area surrounded by an annular optical path, $\lambda$ represents a wavelength corresponding to a central frequency of microwave oscillation, and L represents a circumference of the annular cavity.

Beneficial effects of the present invention lie in that, the present invention uses a bi-directional full reciprocal coupling optoelectronic oscillator to detect an angular velocity with reference to a bi-directional full reciprocal coupling optoelectronic oscillator technology and a conventional resonant optical gyroscope technology. A great advantage of the method is that, in a linear cavity part and a loop part where the Sagnac effect can be sensed, clockwise light and counterclockwise light not only satisfy bi-directional microwave resonance oscillation, but also have good reciprocity, and thus the Sagnac effect can be sensed to implement a high-precision optical carrier microwave gyroscope. Meanwhile, in the method, microwave signal has a high precision of differential frequency detection, a frequency difference is detected by methods such as amplifying frequency multiplication, and the signal to noise ratio is improved. The angular velocity detecting method provided in the present invention does not have a moving component, which is characterized by high measurement accuracy, small volume and easy implementation, thus a requirement for application of a high-precision gyroscope can be satisfied.

BRIEF DESCRIPTION OF DRAWINGS

In order to make technical solutions in embodiments of the present invention clearer, accompanying drawings used for description of the embodiments of the present invention will be described briefly hereunder.

Figure 1:
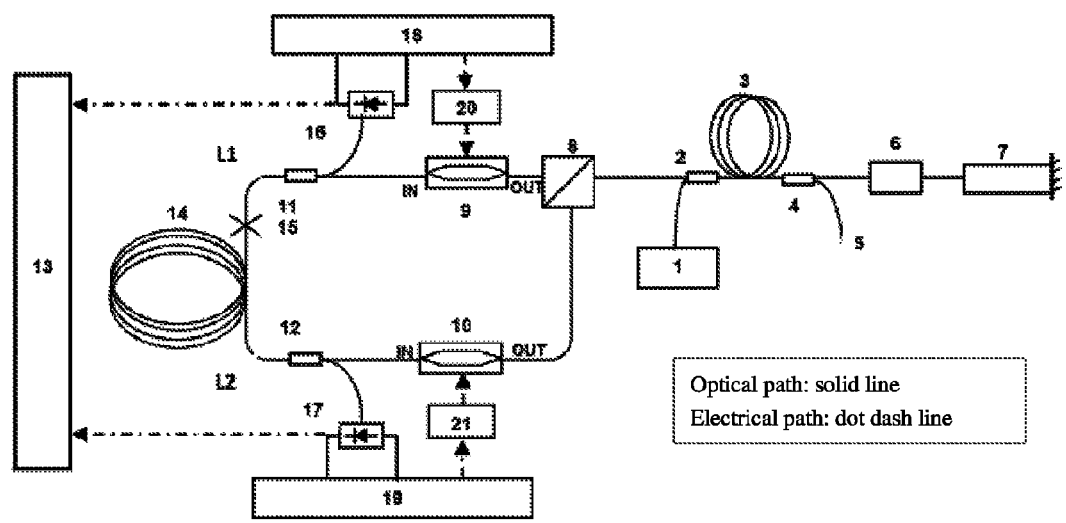
FIG. 1 is an diagram illustrating theory of an angular velocity detection system adopting a bi-directional full reciprocal coupling optoelectronic oscillator according to the present invention.

In the drawings, 1—980 nm pump laser; 2—first 980/1550 wavelength division multiplexer; 3—polarization maintaining Erbium-doped optical fiber; 4—second 980/1550 wavelength division multiplexer; 5—control light drawing-out wire; 6—optical filter; 7—45° polariscope; 8—polarization splitter/combiner; 9—first electro-optical modulator; 10—second electro-optical modulator; 11—first optical fiber coupler; 12—second optical fiber coupler; 13—beat signal detecting and processing circuit; 14—optical fiber annular cavity; 15—90° connector; 16—first photodetector; 17—second photodetector; 18—first microwave regeneration mode locking control circuit; 19—second microwave regeneration mode locking control circuit; 20—first voltage controlled oscillator; 21—second voltage controlled oscillator.

DESCRIPTION OF EMBODIMENTS

In order to make objectives, technical solutions, and advantages of embodiments of the present invention clearer, technical solutions in the embodiments of the present invention will be described clearly and completely hereunder with reference to the accompanying drawings in embodiments of the present invention. Obviously, the described embodiments are only a part of embodiments of the present invention, rather than all embodiments of the present invention. All other embodiments obtained by persons of ordinary skill in the art based on the embodiments of the present invention without any creative effort shall fall into the protection scope of the present invention.

The angular velocity detecting method adopting a bi-directional full reciprocal coupling optoelectronic oscillator used in the present invention is implemented on a bi-directional resonant optical carrier microwave gyroscope. The bi-directional resonant optical carrier microwave gyroscope consists of components such as a 980 nm pump laser 1, a first 980/1550 wavelength division multiplexer 2, a polarization maintaining Erbium-doped optical fiber 3, a second 980/1550 wavelength division multiplexer 4, a control light drawing-out wire 5, an optical filter 6, a 45° polariscope 7, a polarization splitter/combiner 8, a first electro-optical modulator 9, a second electro-optical modulator 10, a first optical fiber coupler 11, a second optical fiber coupler 12, a beat signal detecting and processing circuit 13, an optical fiber annular cavity 14, a 90° connector 15, a first photodetector 16, a second photodetector 17, a first microwave regeneration mode locking control circuit 18, a second microwave regeneration mode locking control circuit 19, a first voltage controlled oscillator 20, and a second voltage controlled oscillator 21.

The following concepts are explained prior to description of steps of the method:

A structure of the entire optical carrier microwave gyroscope is divided by the polarization splitter/combiner 8 into a loop part and a linear cavity part, and two sections of an optical fiber of the loop part are divided by the 90° connector 15 and are marked as L1 and L2, respectively;

An optical path of the linear cavity part of the optical carrier microwave gyroscope is specifically: light output by the laser 1 controlled by a drive current is introduced into the polarization maintaining Erbium-doped optical fiber 3 for amplification after passing through the first 980/1550 wavelength division multiplexer 2, then the light is divided into two parts via the second 980/1550 wavelength division multiplexer 4, where one part is control light, which is drawn out by the control light drawing-out wire 5, and the other part is work light, which continues to pass through frequency selective filtering of the optical filter 6 and its polarization state is rotated by 90° via reflection of the 45° polariscope 7, where the light entering into the polarization splitter/combiner 8 includes two work light beams of which polarization states are orthogonal (marked as a horizontal polarization state and a vertical polarization state respectively), and forms a clockwise resonant loop and a counterclockwise resonant loop at the loop part.

The clockwise resonant loop of the optical carrier microwave gyroscope is specifically: the light of vertical polarization state that enters into the polarization splitter/combiner 8 passes through the second electro-optical modulator 10 (non-modulated) in a clockwise direction (CW), then enters into the optical fiber annular cavity 14 via the second optical fiber coupler 12, and its direction of polarization is changed by 90° via the 90° connector 15, and the light is separated into two beams via the first optical fiber coupler 11 after being changed from the vertical polarization light to the horizontal polarization light, where one beam re-enters into the polarization splitter/combiner 8 to form the clockwise resonant loop after being modulated by the first electro-optical modulator 9; the other beam is introduced into the first photodetector 16, which converts an optical signal into a microwave signal, and subsequently is fed back via the first microwave regeneration mode locking control circuit 18 and the first voltage controlled oscillator 20 to control the first electro-optical modulator 9 performing frequency lock of the clockwise resonant loop.

The counterclockwise resonant loop of the optical carrier microwave gyroscope is specifically: the light of horizontal polarization state that enters into the polarization splitter/combiner 8 passes through the first electro-optical modulator 9 (non-modulated) and the first optical fiber coupler 11 in a counterclockwise direction (CCW), and its direction of polarization is changed by 90° via the 90° connector 15, then the light enters into the optical fiber annular cavity 14 after being changed from the horizontal polarization light to the vertical polarization light, and is separated into two beams via the second optical fiber coupler 12, where one beam re-enters into the polarization splitter/combiner 8 to form the counterclockwise resonant loop after being modulated by the second electro-optical modulator 10; the other beam is introduced into the second photodetector 17, which converts an optical signal into a microwave signal, and subsequently controls the second electro-optical modulator 10 to perform frequency lock of the counterclockwise resonant loop via feedback of the second microwave regeneration mode locking control circuit 19 and the second voltage controlled oscillator 21.

In the linear cavity part, total optical lengths of round trips of the clockwise light and the counterclockwise light in the linear cavity part are completely equal; in the loop part where the Sagnac effect can be sensed, polarization states of the clockwise light and the counterclockwise light in a same section of an optical fiber are totally the same, thereby ensuring good reciprocity in the entire loop.

In FIG. 1, both the first optical fiber coupler 11 and the second optical fiber coupler 12 are optical fiber couplers having an optical power ratio of 99:1.

Figure 2:
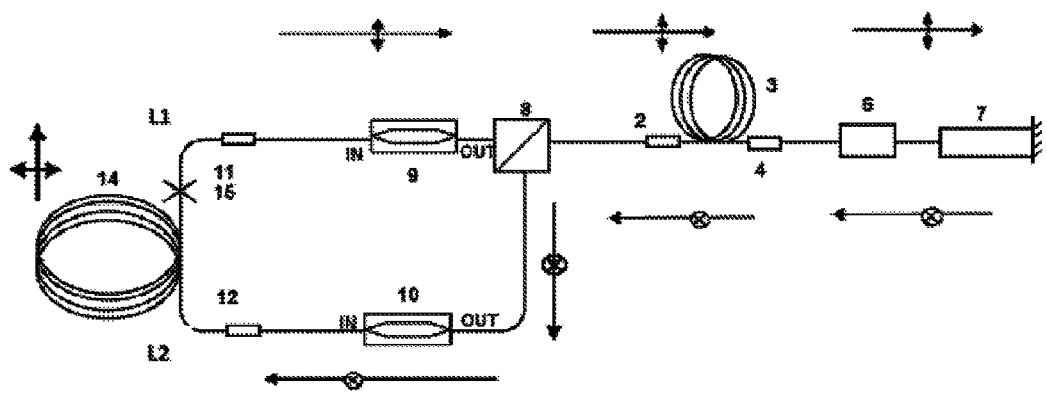
FIG. 2 illustrates a polarization state change in clockwise oscillation of a bi-directional full reciprocal coupling optoelectronic oscillator according to the present invention.
Figure 3:
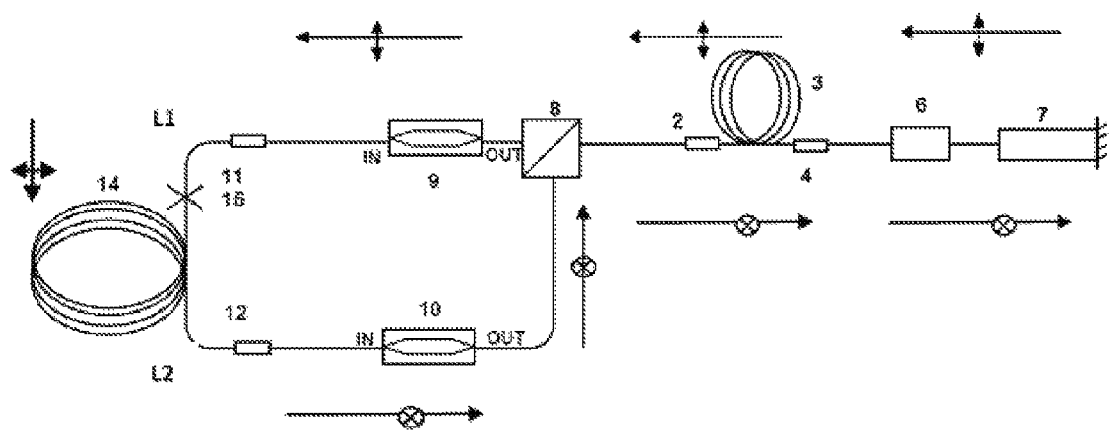
FIG. 3 illustrates a polarization state change in counterclockwise oscillation of a bi-directional full reciprocal coupling optoelectronic oscillator according to the present invention.

The method includes the following steps:

Step 1: as shown in FIG. 2, after being introduced into the polarization maintaining Erbium-doped optical fiber 3 for amplification via the first 980/1550 wavelength division multiplexer 2, the horizontal polarization light emitted from the laser 1 is then subjected to frequency selective filtering via the optical filter 6, and then turns into the vertical polarization light via reflection of the 45° polariscope 7 and returns back via the optical filter 6, the second 980/1550 wavelength division multiplexer 4, the polarization maintaining Erbium-doped optical fiber 3 and the first 980/1550 wavelength division multiplexer 2, which subsequently enters into the polarization splitter/combiner 8, and enters into the second electro-optical modulator 10, the second optical fiber coupler 12 and the optical fiber annular cavity 14 in a clockwise direction sequentially, then turns into the horizontal polarization light via the 90° connector 15, and then is re-introduced into the polarization maintaining Erbium-doped optical fiber 3 for amplification after entering into the first electro-optical modulator 9 for electro-optical modulation via the first optical fiber coupler 11, thereby forming the clockwise resonant loop; as shown in FIG. 3, after being introduced into the polarization maintaining Erbium-doped optical fiber 3 for amplification via the first 980/1550 wavelength division multiplexer 2, the vertical polarization light emitted from the laser 1 is then subjected to frequency selective filtering via the optical filter 6, and then turns into the horizontal polarization light via reflection of the 45° polariscope 7 and returns back via the optical filter 6, the second 980/1550 wavelength division multiplexer 4, the polarization maintaining Erbium-doped optical fiber 3 and the first 980/1550 wavelength division multiplexer 2, which subsequently enters into the polarization splitter/combiner 8, and enters into the first electro-optical modulator 9 and the first optical fiber coupler 11 in a counterclockwise direction sequentially, then turns into the vertical polarization light via the 90° connector 15, and then passes through the optical fiber annular cavity 14 and the second optical fiber coupler 12 sequentially, which subsequently is re-introduced into the polarization maintaining Erbium-doped optical fiber 3 for amplification after entering into the second electro-optical modulator 10 for electro-optical modulation, thereby forming the counterclockwise resonant loop.

Frequency of the optical signal in the counterclockwise loop is:

$$v_a \frac{qc}{L_a},$$

frequency of the optical signal in the clockwise loop is:

$$v_b \frac{qc}{L_b},$$

where $L_a$ is an optical length of the counterclockwise loop, $L_b$ is an optical length of the clockwise loop, and a circumference of the annular cavity is q times of the wavelength of an optical wave.

Step 2: after light in the clockwise resonant loop of the optical carrier microwave gyroscope passing through the first photodetector 16, and the optical signal being converted into a microwave signal, it is subsequently introduced into the first microwave regeneration mode locking control circuit 18 for a frequency lock control operation, and then is fed back via the first voltage controlled oscillator 20 to control the first electro-optical modulator 9, thereby locking the oscillation frequency of the clockwise resonant loop; after light in the counterclockwise resonant loop of the optical carrier microwave gyroscope passing through the second photodetector 17, and the optical signal being converted into a microwave signal, it is subsequently introduced into the second microwave regeneration mode locking control circuit 19 for a frequency lock control operation, and then is fed back via the second voltage controlled oscillator 21 to control the second electro-optical modulator 10, thereby locking the oscillation frequency of the counterclockwise resonant loop.

Step 3: the beat signal detecting and processing circuit 13 detects a resonant frequency difference Δf between the clockwise resonant loop and the counterclockwise resonant loop.

Step 4: according to the Sagnac effect, an angular velocity of rotation $\Omega_r$ can be obtained by the following formula:

$$\Delta f = v_a - v_b = \frac{qc}{L_a} - \frac{qc}{L_b} \approx \frac{\Delta L * qc}{L^2} = \frac{4Sw}{c} * \frac{qc}{L^2} = \frac{4S}{L\lambda} * \Omega_r,$$

then $$\Omega_r = \frac{\lambda L}{4S} \Delta f$$

where, S represents an area surrounded by an annular optical path, λ represents a wavelength corresponding to a central frequency of microwave oscillation, and L represents a circumference of the annular cavity.

In the loop part where the Sagnac effect can be sensed, polarization states of clockwise light and counterclockwise light are exactly the same in a same section of an optical fiber, and good reciprocity is ensured. In the linear cavity part, the clockwise light returns back by changing from a horizontal polarization state to a vertical polarization state via a 45° polariscope, whereas the counterclockwise light returns back by changing from a vertical polarization state to a horizontal polarization state via a 45° polariscope, although the light with the same polarization state has opposite directions of propagation in the same section of optical fiber loop, total optical lengths of round trips of the clockwise light and the counterclockwise light in the linear cavity are completely equal, and thus good reciprocity can also be ensured in the linear cavity part. Hence, the optical carrier microwave gyroscope provided by this solution has good reciprocity in the entire loop.

Persons skilled in the art may readily make variations and modifications according to text descriptions, drawings and claims provided in the present invention without departing from the concept and the scope defined in the claims of the present invention. Any modification or equivalent variation made to the above described embodiments according to the technical thought and essence of the present invention should fall into the protection scope defined in the claims of the present invention.

What is claimed is:

1. An angular velocity detection method adopting a bi-directional full reciprocal coupling optoelectronic oscillator, wherein the method can realize continuous measurement of angular velocity of a bi-directional resonant optical carrier microwave gyroscope, and the optical carrier microwave gyroscope comprises a 980 nm pump laser (1), a first 980/1550 wavelength division multiplexer (2), a polarization maintaining Erbium-doped optical fiber (3), a second 980/1550 wavelength division multiplexer (4), a control light drawing-out wire (5), an optical filter (6), a 45° polariscope (7), a polarization splitter/combiner (8), a first electro-optical modulator (9), a second electro-optical modulator (10), a first optical fiber coupler (11), a second optical fiber coupler (12), a beat signal detecting and processing circuit (13), an optical fiber annular cavity (14), a 90° connector (15), a first photodetector (16), a second photodetector (17), a first microwave regeneration mode locking control circuit (18), a second microwave regeneration mode locking control circuit (19), a first voltage controlled oscillator (20), and a second voltage controlled oscillator (21);

a structure of the entire optical carrier microwave gyroscope is divided by the polarization splitter/combiner (8) into a loop part and a linear cavity part, and two sections of an optical fiber of the loop part are divided by the 90° connector (15) and are marked as L1 and L2, respectively;

an optical path of the linear cavity part of the optical carrier microwave gyroscope is specifically: light output by the laser (1) controlled by a drive current is introduced into the polarization maintaining Erbium-doped optical fiber (3) for amplification after passing through the first 980/1550 wavelength division multiplexer (2), then the light is divided into two parts via the second 980/1550 wavelength division multiplexer (4), one part is control light, which is drawn out by the control light drawing-out wire (5), and the other part is work light, which continues to pass through frequency selective filtering of the optical filter (6) and its polarization state is rotated by 90° via reflection of the 45° polariscope (7), wherein light entering into the polarization splitter/combiner (8) comprises two work light beams of which polarization states are orthogonal (marked as a horizontal polarization state and a vertical polarization state respectively), and forms a clockwise resonant loop and a counterclockwise resonant loop at the loop part;

the clockwise resonant loop of the optical carrier microwave gyroscope is specifically: the light of vertical polarization state that enters into the polarization splitter/combiner (8) passes through the second electro-optical modulator (10) (non-modulated) in a clockwise direction (CW), then enters into the optical fiber annular cavity (14) via the second optical fiber coupler (12), and its direction of polarization is changed by 90° via the 90° connector (15), and is separated into two beams via the first optical fiber coupler (11) after being changed from vertical polarization light to horizontal polarization light, wherein one beam re-enters into the polarization splitter/combiner (8) to form the clockwise resonant loop after being modulated by the first electro-optical modulator (9); the other beam is introduced into the first photodetector (16), which converts an optical signal into a microwave signal, and subsequently is fed back via the first microwave regeneration mode locking control circuit (18) and the first voltage controlled oscillator (20) to control the first electro-optical modulator (9) performing frequency lock of the clockwise resonant loop;

the counterclockwise resonant loop of the optical carrier microwave gyroscope is specifically: the light of horizontal polarization state that enters into the polarization splitter/combiner (8) passes through the first electro-optical modulator (9) (non-modulated) and the first optical fiber coupler (11) in a counterclockwise direction (CCW), and its direction of polarization is changed by 90° via the 90° connector (15), then enters into the optical fiber annular cavity (14) after being changed from horizontal polarization light to vertical polarization light, and is separated into two beams via the second optical fiber coupler (12), wherein one beam re-enters into the polarization splitter/combiner (8) to form the counterclockwise resonant loop after being modulated by the second electro-optical modulator (10); the other beam is introduced into the second photodetector (17), which converts an optical signal into a microwave signal, and subsequently is fed back via the second microwave regeneration mode locking control circuit (19) and the second voltage controlled oscillator (21) to control the second electro-optical modulator (10) performing frequency lock of the counterclockwise resonant loop;

the method comprises the following steps:

step 1-1: forming the clockwise resonant loop, wherein the forming the clockwise resonant loop includes:

the horizontal polarization light emitted from the laser (1) is subsequently passed via the first 980/1550 wavelength division multiplexer (2), the polarization maintaining Erbium-doped optical fiber (3) for amplification, the optical filter (6) for frequency selective filtering, the 45° polariscope (7) for reflection into vertical polarization light, the optical filter (6), the second 980/1550 wavelength division multiplexer (4), the polarization maintaining Erbium-doped optical fiber (3), the first 980/1550 wavelength division multiplexer (2), and the polarization splitter/combiner (8), and is sequentially introduced into the second electro-optical modulator (10), the second optical fiber coupler (12), the optical fiber annular cavity (14), the 90° connector (15) for changing into horizontal polarization light, the first optical fiber coupler (11), the first electro-optical modulator (9) for electro-optical modulation and the polarization maintaining Erbium-doped optical fiber (3) for amplification in a clockwise direction, therefore the clockwise resonant loop is formed;

step 1-2: forming the counterclockwise resonant loop, wherein the forming the counterclockwise resonant loop includes:

the vertical polarization light emitted from the laser (1) is subsequently passed via the first 980/1550 wavelength division multiplexer (2), the polarization maintaining Erbium-doped optical fiber (3) for amplification, the optical filter (6) for frequency selective filtering, the 45° polariscope (7) for reflection into vertical polarization light, the optical filter (6), the second 980/1550 wavelength division multiplexer (4), the polarization maintaining Erbium-doped optical fiber (3), the first 980/1550 wavelength division multiplexer (2), and the polarization splitter/combiner 8 and is sequentially introduced into the first electro-optical modulator (9), the first optical fiber coupler (11), the 90° connector (15) for changing into vertical polarization light, the optical fiber annular cavity (14), the second optical fiber coupler (12), the second electro-optical modulator (10) and the polarization maintaining Erbium-doped optical fiber (3) for amplification in a counterclockwise direction, therefore the clockwise resonant loop is formed;

step 2-1: locking an oscillation frequency of the clockwise resonant loop, wherein the locking an oscillation frequency of the clockwise resonant loop includes:

light in the clockwise resonant loop is passed via the first photodetector (16) for generation of a resonant microwave signal, and the resonant microwave signal generated by the first photodetector (16) is subsequently passed via the first microwave regeneration mode locking control circuit (18) for a frequency lock control operation, the first voltage controlled oscillator (20) for feedback controlling of the first electro-optical modulator (9), therefore the oscillation frequency of the clockwise resonant loop is locked;

step 2-2: locking an oscillation frequency of the counterclockwise resonant loop, wherein the locking an oscillation frequency of the counterclockwise resonant loop includes:

light in the counterclockwise resonant loop is passed via the second photodetector (17) for generation of a resonant microwave signal, and the resonant microwave signal generated by the second photodetector (17) is subsequently passed via the second microwave regeneration mode locking control circuit (19) for a frequency lock control operation, the second voltage controlled oscillator (21) for feedback controlling of the second electro-optical modulator (10), therefore the oscillation frequency of the counterclockwise resonant loop is locked;

step 3: detecting, by the beat signal detecting and processing circuit (13), a resonant frequency difference $\Delta f$ between the clockwise resonant loop and the counterclockwise resonant loop; and step 4: obtaining an angular velocity of rotation $\Omega_r$ by the following formula:

$$\Omega_r = \frac{\lambda L}{4S}\Delta f$$

wherein, S represents an area surrounded by an annular optical path, $\lambda$ represents a wavelength corresponding to a central frequency of microwave oscillation, and L represents a circumference of the annular cavity.

* * * * *